United States Patent
Bajo

(10) Patent No.: US 6,564,668 B1
(45) Date of Patent: May 20, 2003

(54) SMALL SIZED DRIVER MECHANISM WITH DOUBLE SPHERICAL CAM, FOR MECHANICAL AUTOMATONS

(75) Inventor: Flavio Bajo, Bergamo (IT)

(73) Assignee: Colombo Fillippetti S.p.A., Casirate d'Abba (IT)

( * ) Notice: Subject to any disclaimer, the term of this patent is extended or adjusted under 35 U.S.C. 154(b) by 0 days.

(21) Appl. No.: 09/831,795

(22) PCT Filed: Nov. 9, 1999

(86) PCT No.: PCT/IB99/01797

§ 371 (c)(1),
(2), (4) Date: May 9, 2001

(87) PCT Pub. No.: WO00/29174

PCT Pub. Date: May 25, 2000

(30) Foreign Application Priority Data

Nov. 13, 1998 (IT) ......................... BG98A0062

(51) Int. Cl.[7] ............................................... F16H 25/16
(52) U.S. Cl. ........................... 74/490.05; 74/55; 74/567
(58) Field of Search ................ 74/490.05, 25, 74/27, 53, 54, 55, 567, 568

(56) References Cited

U.S. PATENT DOCUMENTS

| | | | | |
|---|---|---|---|---|
| 3,023,719 A | * | 3/1962 | Tobias et al. ................... 74/25 |
| 3,785,282 A | * | 1/1974 | Kamelander ................... 74/25 |
| 4,333,426 A | * | 6/1982 | Gavasso et al. ......... 123/90.27 |
| 4,535,643 A | * | 8/1985 | Hauptman ..................... 74/25 |
| 4,856,469 A | * | 8/1989 | Okazaki et al. .......... 123/90.51 |
| 5,092,186 A | * | 3/1992 | Frank ............................. 74/25 |
| 5,207,193 A | * | 5/1993 | Sugimoto ................ 123/90.27 |
| 5,345,831 A | * | 9/1994 | Sandrock ........................ 74/53 |
| 5,359,974 A | * | 11/1994 | Nonogawa et al. ......... 123/432 |
| 5,361,736 A | * | 11/1994 | Phoenix et al. ............ 74/568 R |
| 5,868,042 A | * | 2/1999 | Swars ........................ 74/567 |
| 6,073,503 A | * | 6/2000 | Matsuno et al. ................ 74/55 |

* cited by examiner

Primary Examiner—David A. Bucci
Assistant Examiner—Colby Hansen
(74) Attorney, Agent, or Firm—Steinberg & Raskin, P.C.

(57) ABSTRACT

The driver mechanism of double spherical cam type for mechanical automatons has the characteristic of being small overall size deriving from the use of two different (6, 7) cams formed on the two ends of a rotary hollow cylinder (5), this cylinder housing internally, rigid with a fixed platform or structure (1) of the machine, a column element (10) for fixing support bearings (8, 9) for said rotary hollow cylinder and for fixing the pivot for two right angled levers (13, 14) having at least one of their ends (16–17, 18–19) acting as a cam follower and their other free (20, 21) end driving the final user slide (30, 33), one (35) of said driving actions, which are provided by pins (22, 36) at the two free ends of the two right angled levers (13, 14), being direct and the other being implemented via a suitable transmission lever (25).

1 Claim, 4 Drawing Sheets

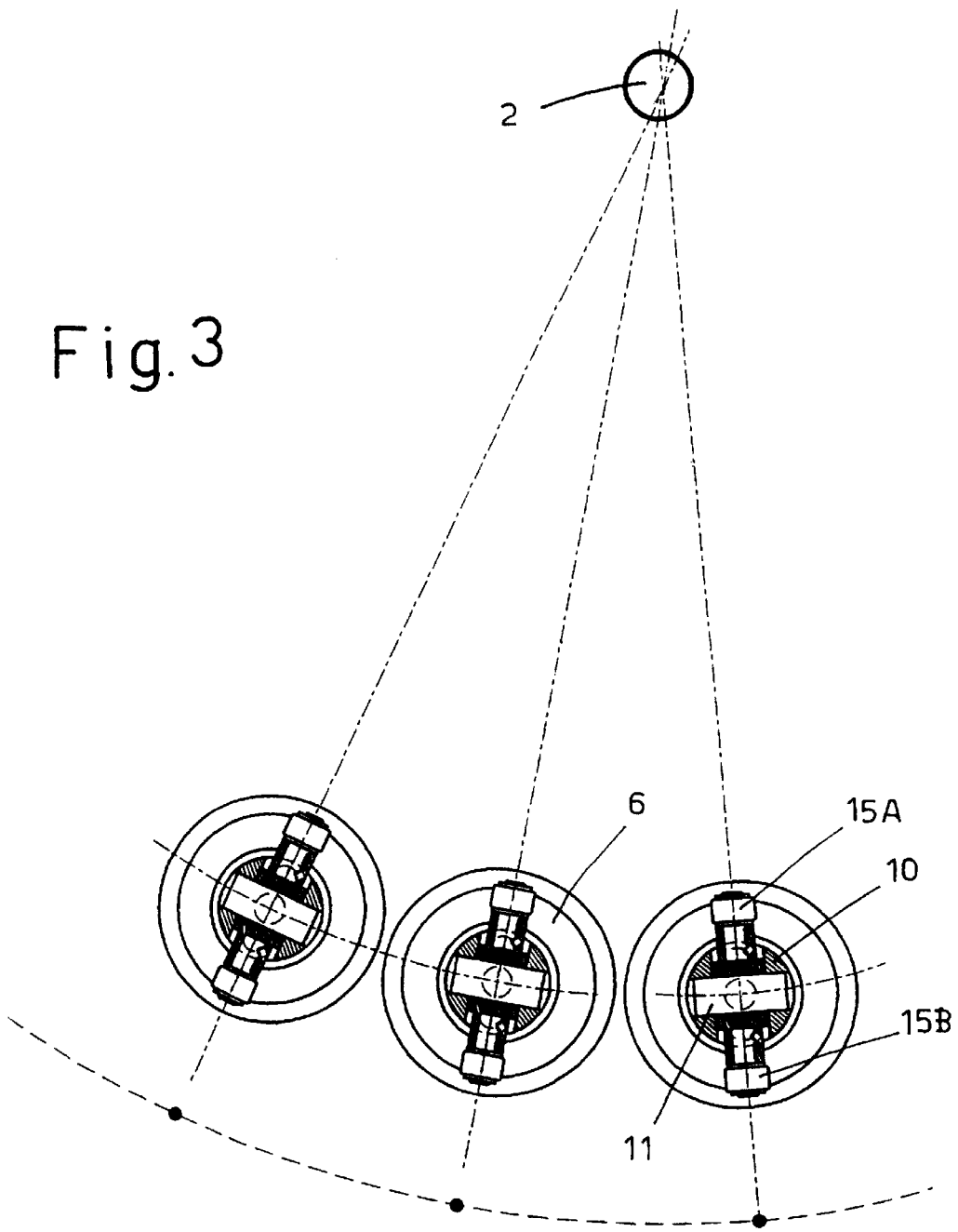

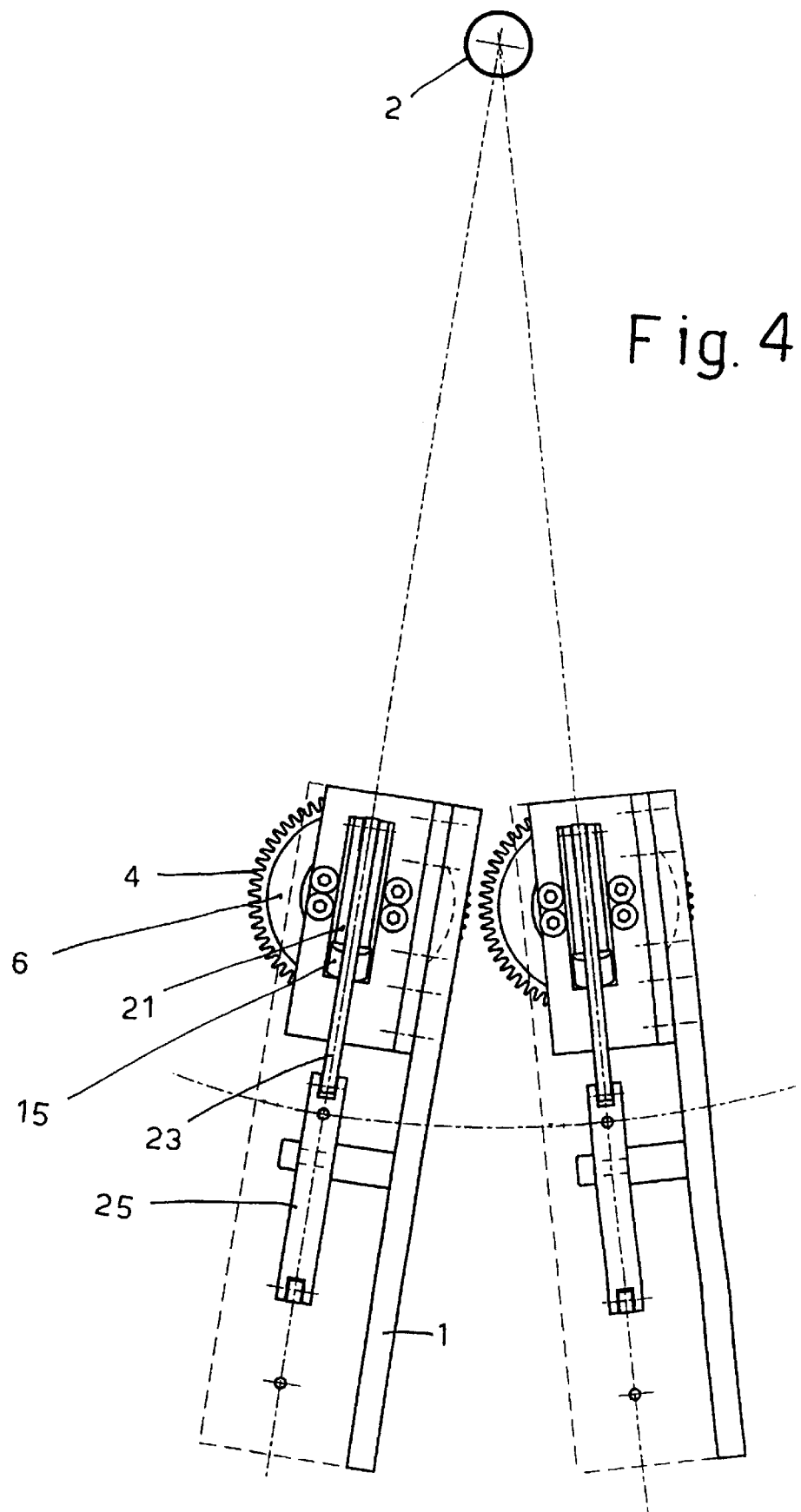

SMALL SIZED DRIVER MECHANISM WITH DOUBLE SPHERICAL CAM, FOR MECHANICAL AUTOMATONS

TECHNICAL FIELD

This invention relates to a small sized driver mechanism with double spherical cam for mechanical automatons.

BACKGROUND ART

As is well known, general use is made in industry of manipulators (or robots) provided to rapidly carry out synchronized regular cyclic operations requiring movement within a certain plane along complex trajectories at predetermined velocities. Said manipulators are used in the most different fields, from machine tools to assembly machines.

In most of the applications of these manipulators, the overall size of such mechanisms is of considerable importance. A representative case is that of their installation on rotary assembly platforms with radial arms, in which the various operating stations must be as close and as numerous as possible to achieve rapid intervention and machine economy.

An object of the invention is to define a driver mechanism of double cam type which is of small overall size. Another object is to define a mechanism of the aforesaid type which is of low-cost construction. A further object is to define a mechanism of the aforesaid type which can be constructed with elements of considerable operational reliability.

DISCLOSURE OF INVENTION

These and further objects will be seen to be attained on reading the following detailed description illustrating a driver mechanism of double spherical cam type for mechanical automatons, characterized by being of small overall size deriving from the use of two different cams formed on the two ends oaf rotary hollow cylinder, this cylinder housing internally, rigid with a fixed platform or structure of the machine, a column element for fixing support bearings for said rotary hollow cylinder and for fixing pivot pins for two right angled levers having at least one of their ends acting as a cam follower and their other free end driving the final user slide, one of said driving actions, which are provided by pins at the two free ends of the two right angled levers, being direct and the other being implemented via a suitable transmission lever to achieve perpendicular directions obtained by sliding movement along suitable guides, said guides being slidable one on and perpendicular to the other so that the second slide acting as the final user can have an exclusive position within the operating plane deriving from the combination of the two movements.

BRIEF DESCRIPTION OF DRAWINGS

The invention is illustrated by non-limiting example on the accompanying drawings, on which:

FIG. 3 is a plan section through three mechanisms located side by side with their axes arranged radially to converge at a common center;

FIG. 4 is a view from above showing the three aforesaid mechanisms.

BEST MODE OF CARRYING OUT THE INVENTION

Figure 1:
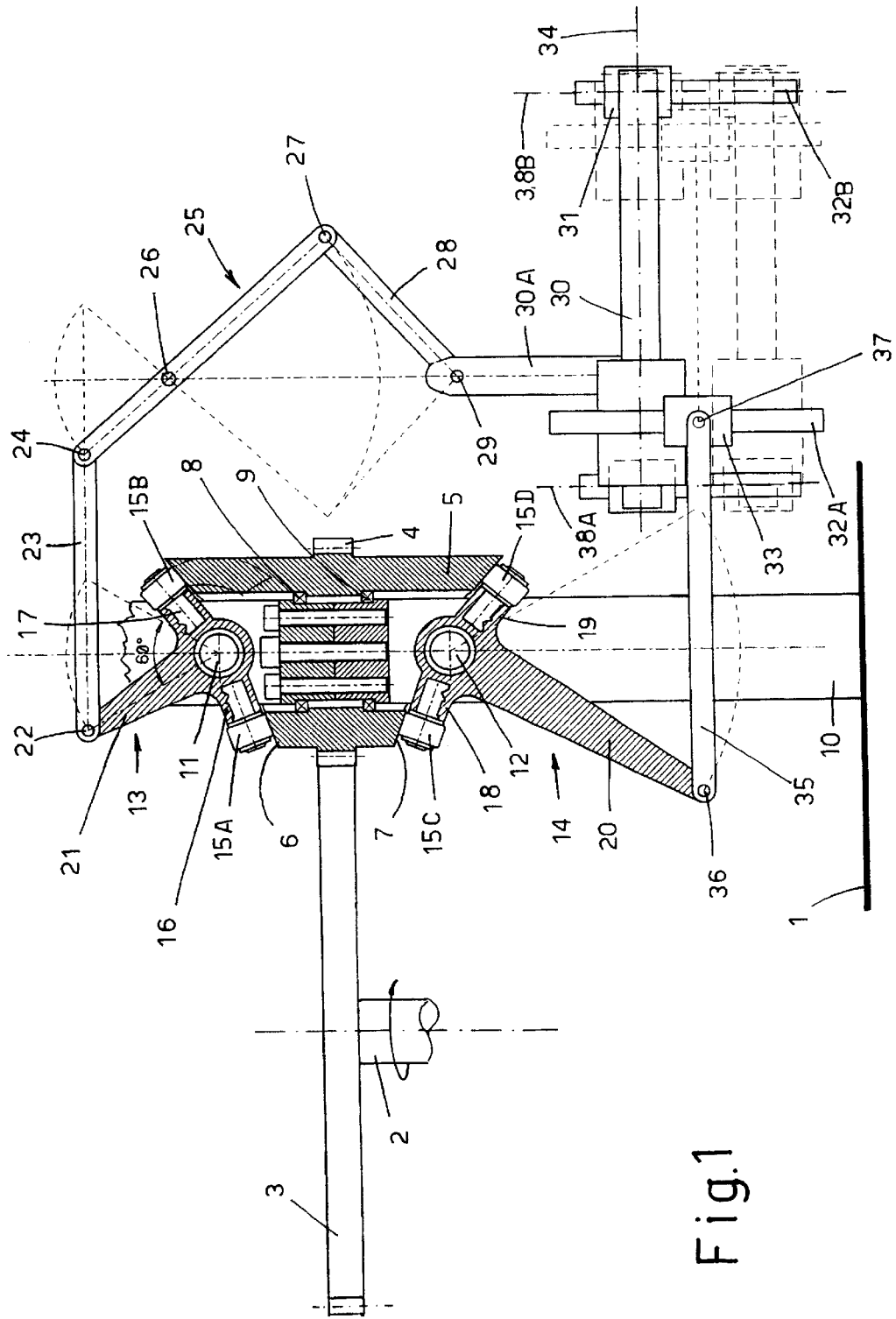
FIG. 1 is a diametrical schematic section through a mechanism, with its basic articulations and the end positions assumable by the slides being indicated by dashed lines.

With reference to said figures, an assembly platform with radial arms carries a central shaft 2 on which a large ring gear 3 is keyed. The ring gear engages a peripheral gearwheel 4 mounted on the outside of a hollow cylinder 5 having its upper end 6 and lower end 7 shaped with a cam profile. The hollow cylinder 5 is rotatable on a pair of bearings 8, 9 supported by a column element 10 rigid with the fixed structure of the platform. On the column element 10 there are fixed two pins 11 and 12 about which there rotates a respective right angled lever 13 and 14. These right angled levers 13 and 14 act as cam followers engaged against the upper end 6 and lower end 7 of the hollow cylinder 5. This occurs by way of usual rolling rollers 15, namely 15A, 15B, 15C, 15D. On the drawing the two right angled levers are each associated with two follower arms 16–17 and 18–19 respectively, assisted by the rollers 15A, 15B, 15C, 15D. This implies that the cam profiles provided by the upper end 6 and lower end 7 are complementary, in the sense that when the roller 15A rises, the opposite roller 15B has to descend proportionally. This complementary situation can be avoided by entrusting the contact between the rollers and their cam profile to the preloading of usual return springs. In any event the two right angled levers 13 and 14 undergo angular rotations deriving from the contact of their followers against the cam profiles represented by the upper end 6 and lower end 7 of the hollow cylinder 5. The two right angled levers comprise an arm 20, 21 the 'H of which is suitable chosen for the operation to be carried out. On the free end of the arm 21 there is provided a pin 22 on which there is hinged a first connection rod 23 the other end of which is hinged by a pin 24 to a first class lever 25. The lever has its pivot 26 rigid with the fixed part of the platform 1 and its other free end hinged by a pin 27 to a second connecting rod 28. The other end of the second connecting rod 28 is arranged to move a peg 30A of a slide 30 slidable via its end bushes 31 on two fixed parallel guide bars 32A, 32B having axes 38A, 38B. From the configuration shown in FIG. 1 it is hence apparent rotations in the "left-right" direction of the arm 21 determine movements in the "upward-downward" direction of the slide 30. The slide 30 carries guide elements for the sliding of a second slide 33 which in this manner can slide along an axis 34 which traverses together with the slide 30. The slide 33 is connected to the lever arm 20 of the other follower of the mechanism by a connecting rod 35 provided with hinge pins 36 and 37. This connection is direct, and consequently as the lever arm 20 moves in a similar manner to the arm 21, it moves its own slide 33 in a direction perpendicular to that in which the slide 30 is moved by the arm 21. The aforedescribed linkage enables the slide 33 to acquire a position within a vertical plane (containing the perpendicular axes 34 and 38A–38B) having x and y coordinates derivable from the combination of the angular positions of the arms 20 and 21, i.e. from the combination of the two cam profiles provided by the ends 6 and 7 of the hollow cylinder. In this manner the slide 33 can be driven along any required cyclic outward and return trajectory by action means associated with it, to operate in the required manner.

Figure 2:
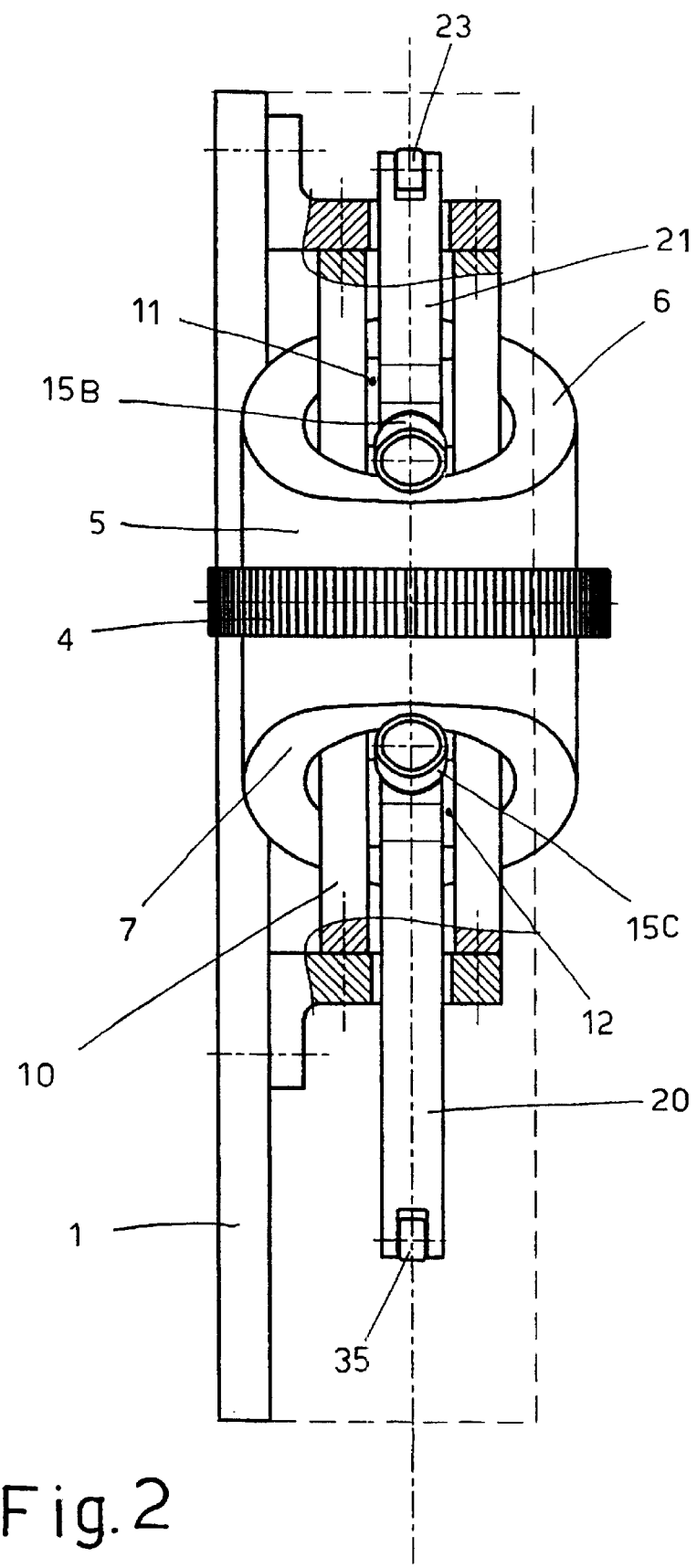
FIG. 2 is a side view of a hollow rotary cylinder with its two ends shaped as a cam of the type known as a "spherical cam"

FIG. 2 enables its parts to be better identified by referring to the numbers of the already stated parts. FIGS. 3 and 4 enable the location of the mechanism to be understood-within the context of its application to typical radial arms of an assembly platform, the vertical axis or centre of rotation of which is indicated.

What is claimed is:

1. A driving mechanism for mechanical automatons, comprising:

- a rotary hollow cylinder (5) having a first spherical cam and a second spherical cam (6,7);
- a column element (10);
- a first and a second bearing (8, 9) mounted to said column element (10) for facilitating the rotation of said rotary hollow cylinder (5);
- a first and a second pivot pin (11, 12) mounted to said column (10);
- a first and a second angled lever (13, 14), each one of said levers mounted to a respective one of said pivot pins, each one of said angled levers having a first end structured and arranged to act as a cam follow in response to a movement of said first and second spherical cams, and having a second free end;
- a final user slide assembly;
- a link having a first end coupled to said free end of said first angled lever;
- a link assembly including a plurality of interconnected links, a first one of said links having a free end coupled to said free end of said second angled lever;
- a second one of said links having a free end couple to said free end of said final slide assembly; and
- whereby said final slide assembly is moved within a single linear plane.

* * * * *

UNITED STATES PATENT AND TRADEMARK OFFICE
CERTIFICATE OF CORRECTION

PATENT NO.   : 6,564,668 B1
DATED        : May 20, 2003
INVENTOR(S)  : Flavio Bajo It is certified that error appears in the above-identified patent and that said Letters Patent is hereby corrected as shown below:

<u>Title page,</u>
Item [73], should read -- Colombo Filippetti S.p.A. --

Signed and Sealed this

Twenty-sixth Day of August, 2003

JAMES E. ROGAN
*Director of the United States Patent and Trademark Office*